(12) United States Patent
Kaitz et al.

(10) Patent No.: US 8,584,623 B2
(45) Date of Patent: Nov. 19, 2013

(54) DOG LEASH UNTANGLER FOR MORE THAN ONE DOG

(76) Inventors: Steven M. Kaitz, New York, NY (US); Stephen M. Foster, Drexel Hill, PA (US)

( * ) Notice: Subject to any disclaimer, the term of this patent is extended or adjusted under 35 U.S.C. 154(b) by 0 days.

(21) Appl. No.: 13/450,190

(22) Filed: Apr. 18, 2012

(65) Prior Publication Data

US 2012/0260866 A1  Oct. 18, 2012

Related U.S. Application Data

(60) Provisional application No. 61/476,389, filed on Apr. 18, 2011.

(51) Int. Cl.
*A01K 27/00* (2006.01)
(52) U.S. Cl.
USPC .............................. 119/795; 119/787; 119/796
(58) Field of Classification Search
USPC ......... 119/795, 787, 796, 786, 791, 792, 794, 119/856, 857
See application file for complete search history.

(56) References Cited

U.S. PATENT DOCUMENTS

| | | | | |
|---|---|---|---|---|
| 2,776,644 A * | 1/1957 | Fontaine | .................. | 119/796 |
| 4,879,972 A * | 11/1989 | Crowe et al. | .................. | 119/792 |
| 5,632,234 A * | 5/1997 | Parker | .................. | 119/795 |
| 5,852,988 A * | 12/1998 | Gish | .................. | 119/795 |
| 5,901,668 A * | 5/1999 | Goodger, Sr. | .................. | 119/795 |
| 6,247,428 B1 * | 6/2001 | Mireles | .................. | 119/795 |
| 6,273,029 B1 * | 8/2001 | Gish | .................. | 119/792 |
| 6,460,488 B1 * | 10/2002 | Manzella et al. | .................. | 119/798 |
| 6,474,270 B1 * | 11/2002 | Imes | .................. | 119/796 |
| 6,626,132 B1 * | 9/2003 | Mann | .................. | 119/795 |
| 6,792,893 B1 * | 9/2004 | Quintero et al. | .................. | 119/796 |
| 7,114,467 B2 * | 10/2006 | Jones | .................. | 119/795 |
| 7,559,292 B2 * | 7/2009 | Blandford | .................. | 119/796 |
| 7,926,451 B2 * | 4/2011 | Foster | .................. | 119/795 |
| 7,980,202 B2 * | 7/2011 | Bentz et al. | .................. | 119/796 |
| 8,151,735 B1 * | 4/2012 | McCrocklin | .................. | 119/796 |
| 2007/0215065 A1 * | 9/2007 | Furlich | .................. | 119/795 |

\* cited by examiner

*Primary Examiner* — Yvonne Abbott
(74) *Attorney, Agent, or Firm* — Levisohn Berger LLP

(57) ABSTRACT

The present invention is directed to a dual pet leash, including a spherical-shaped or ellipsoid-shaped or cone-shaped or cylindrical-shaped or egg-shaped detangling element, a handle located adjacent the detangling element, and two or more pet attachment portions or straps extending from the detangling element, the pet attachment portions spaced approximately equidistant from each other, or spaced on approximately opposite sides of the detangling element. Latches for attaching to the pet attachment portions to a pet's collar or pet's harness are also provided. The detangling element is configured to rotate about the bolt 14 identified in the above captioned patent application, and ensuring that the leashes have different lengths contributes to the detangling and better functioning of the untangler device.

4 Claims, 1 Drawing Sheet

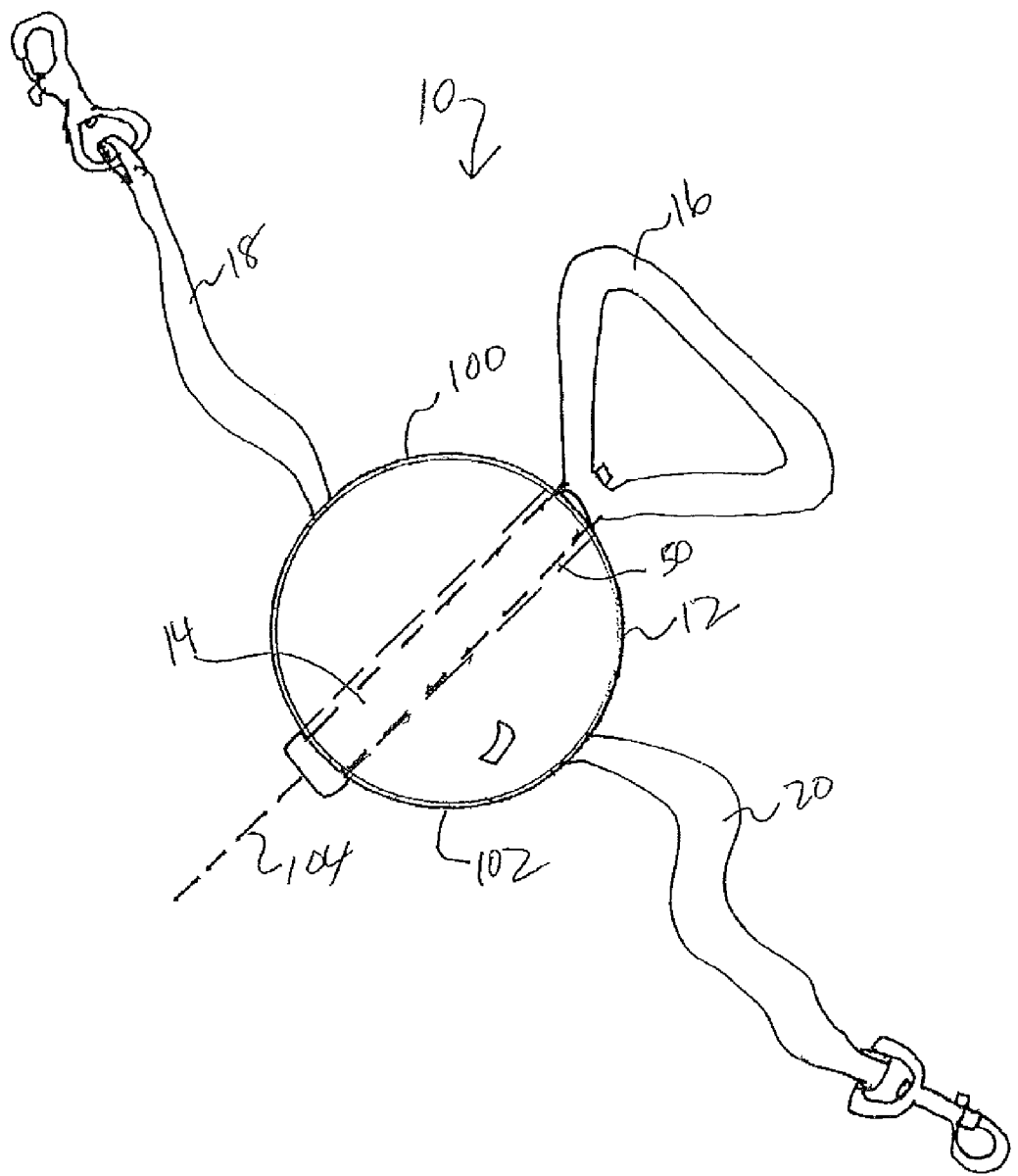

DOG LEASH UNTANGLER FOR MORE THAN ONE DOG

RELATED APPLICATIONS

This application claims the benefit of U.S. provisional patent application 61/476,389, filed Apr. 18, 2011 which is incorporated herein by reference.

BACKGROUND OF THE INVENTION

It has been found that the above described invention improves its operation if the leashes 18 and 20 attached to the detangling element are always of unequal length.

The detangling element is configured to rotate about a bolt 14 identified in the above captioned patent, and ensuring that the leashes have different lengths contributes to the detangling and better functioning of the untangler device.

BRIEF DESCRIPTION OF THE DRAWINGS

FIG. 1 is a perspective view of an embodiment of a leash for use with multiple pets with detangling element according to the present invention, with portions shown in partial cross-section and phantom.

DETAILED DESCRIPTION

Referring to FIG. 1 (which is identical to FIG. 1 of U.S. Pat. No. 7,926,451), leashes 18 and 20 are of unequal length with respect to each other and such unequal lengths are ensured as part of the improvement of this invention. The differences between the lengths of 18 and 20 may be chosen by the user, but this invention specifically requires that the lengths of leashes 18 and 20 be different one from the other.

FIG. 1 in the prior patent is illustrative of leashes 18 and 20 (otherwise referred to as pet attachment portion) without specific lengths being specified in the drawing.

The dual pet leash system described in detail in U.S. Pat. No. 7,926,451 is identical to the dual pet leash system of this invention and functions similarly except for the invention herein having unequal lengths for leashes 18 and 20 as they extend from detangling element 100.

Use of unequal lengths is not restricted to any particular shape for element 100, and the benefits of unequal leash lengths will be realized for any shape detangling element 100.

It should be understood that the preferred embodiment was described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The invention claimed is:

1. A leash apparatus for use with multiple pets, said leash apparatus comprising:
 a detangling element having a curved surface, an axis and a passage along the axis;
 a bolt positioned through the axis of said detangling element, the bolt having a handle portion extending from an end of the bolt;
 a first pet attachment portion extending from the surface of said detangling element;
 a second pet attachment portion extending from the surface of said detangling element and spaced apart from the first pet attachment portion; wherein the detangling element is configured to rotate about the bolt, and
 said first and second pet attachment portions being of unequal length, said first pet attachment portion and the second pet attachment portion extend from approximately opposite sides of the surface of the detangling element.

2. The leash for use with multiple pets according to claim 1, wherein the first pet attachment portion and the second pet attachment portion are spaced approximately equidistant from each other at the detangling element.

3. The leash for use with multiple pets according to claim 1, wherein the detangling element has a spherical shape.

4. The leash for use with multiple pets according to claim 1, wherein first pet attachment portion and the second pet attachment portion have latches at the end thereof configured to attach to a pet collar or pet harness.

* * * * *